(12) United States Patent
Brandestini et al.

(10) Patent No.: US 6,304,344 B1
(45) Date of Patent: *Oct. 16, 2001

(54) IMAGE DIGITIZING SYSTEM

(75) Inventors: Marco Brandestini, Kirkland; Richard A. Ferraro, Seattle, both of WA (US); Masashi Tazawa, Kanagawa-ken (JP); Eisaku Maeda, Chiba-ken (JP); Nobuhiro Fujinawa; Osamu Ikeda, both of Kanagawa-ken (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,111

(22) Filed: Aug. 13, 1997

Related U.S. Application Data (63) Continuation of application No. 08/729,073, filed on Oct. 10, 1996, which is a continuation of application No. 08/601,490, filed on Feb. 14, 1996, which is a continuation of application No. 08/333,944, filed on Nov. 3, 1994, which is a continuation of application No. 07/998,457, filed on Dec. 30, 1992, now abandoned, which is a continuation-in-part of application No. 07/753,185, filed on Aug. 30, 1991, now abandoned.

(30) Foreign Application Priority Data

Aug. 28, 1992 (JP) .................................................. 4-230057

(51) Int. Cl.[7] .................................................. H04N 1/04
(52) U.S. Cl. .................... 358/487; 358/474; 358/498; 353/103; 353/108; 355/75
(58) Field of Search .................... 358/487, 474, 358/492, 496, 498; 353/103, 108, 114, 115, 120; 355/75, 55

(56) References Cited

U.S. PATENT DOCUMENTS

| 1,032,798 | 7/1912 | Zimmerman | 353/115 |
| 1,407,906 | 2/1922 | Wenderhold | 353/114 |
| 4,161,365 | 7/1979 | Anderson et al. | 355/75 |
| 4,592,647 | 6/1986 | Seto | 355/55 |
| 4,804,982 | 2/1989 | Norris | 346/160 |
| 4,858,003 | 8/1989 | Wirt et al. | 358/102 |
| 5,099,512 | * 3/1992 | Shigami et al. | 358/440 |
| 5,113,268 | 5/1992 | Yoshida et al. | 358/487 |
| 5,371,614 | * 12/1994 | Ito | 358/487 |

FOREIGN PATENT DOCUMENTS 2148658   5/1985  (GB).

OTHER PUBLICATIONS

Patent Abstracts of Japan;vol. 9, No. 173 (Jul. 18, 1985) JP–A–60 046 659, Mar. 13, 1985 (1 page).

"Nikon LS–3500 Scanner has the Edge on Detail", MacWeek, Jan. 30, 1990, 2 pages.

(List continued on next page.)

Primary Examiner—Thomas D. Lee (57) ABSTRACT

A transporting system for an image digitizer can handle both positive and negative transparent film material. The transport features accurate linear motion with high resolution in a single compact unit. For the processing of individually framed slides, an automatic eject mechanism is provided. Both manual and motor driven focus adjustments are provided. Individual images can be oriented by an angular adjustment option. A special carrier allows the system to process negatives in uncut strips. The transport can manage larger number of images using either a slide tray or roll feed attachment.

16 Claims, 8 Drawing Sheets

OTHER PUBLICATIONS

Marketing brochure for Barneyscan, 2 pages.
Marketing brochure for EIKONIX 1435 Slide Scanner, 4 pages.
Advertisement for JVC's KY–15CI, 1 page.
Advertisement for SCAN–T, 1 page.
Advertisement for TRIX, PolaRIX and ScanRix software, 1page.
Marketing brochure for Scanmaster Color Scanners by Howtek, 4 pages.
Advertisement for Windows ColorLab I/P, 1 page.
Marketing brochure for MSF–300Z Scanner by Microtek, 4 pages.
Marketing brochure for Truvel TZ3BWC Color Scanner, 2 pages.

* cited by examiner

IMAGE DIGITIZING SYSTEM

This application is a continuation of U.S. Ser. No. 08/729,073, filed Oct. 10, 1996, which is a continuation of U.S. Ser. No. 08/601,490, filed Feb. 14, 1996, which is a continuation of U.S. Ser. No. 08/333,944, filed Nov. 3, 1994, which is a continuation of U.S. Ser. No. 07/998,457, filed Dec. 30, 1992, abandoned, which is a CIP of U.S. Ser. No. 07/753,185, filed Aug. 30, 1991, abandoned.

BACKGROUND OF THE INVENTION

1. Field of the Invention

This invention relates to an apparatus for digitizing transparencies or negatives in a desk-top computer environment and, more particularly, to such an apparatus designed to accommodate images presented as individually mounted slides, negatives in strips, or roll material.

2. Related Background Art

Image digitizers and their associated image processing workstations have grown in popularity. Individual graphic designers, advertisers, realtors and news reporters are incorporating this kind of image acquisition into their daily work. These digitizers or scanners are typically connected to computers for use in conjunction with desk-top publishing programs.

In addition, an image digitizer can be installed in a color copier, color printer, color facsimile machine or portable image transmission system. Further, a large part of the proofing can be accomplished by digitizing and sending the film data to a monitor.

A user typically purchases a scanner based upon cost, ease of use, performance and reliability. Desirable features are that it should not occupy considerable desk space. It should provide high performance, but still be affordable. If the decision is for a transparency scanner, the unit should be able to process negatives in their native format, namely uncut strips of 4 to 6 frames. Some users, such as stock photography houses, art galleries or museums, have a need to digitize large numbers of images for cataloging, archiving, or transmission over telephone lines.

SUMMARY OF THE INVENTION

One object of the present invention is the provision of a system which is inexpensive, compact, rugged and accurate. In order to be inexpensive, it must be easily assembled and not require critical alignment.

A further object is the implementation of a single assembly which includes all of the mechanical and optical components of the transparency digitizing system.

A further object is to provide a calibrated mechanical angular adjustment of images on the film before digitization.

A further object is to both accept and eject media through a front loading opening.

A further object is to accept an elongate film strip through a front loading opening and to discharge the strip through a second opening, preferably in the rear of the unit.

A further object is the capability to manage large numbers of individual images without the need for operator interaction.

An image digitizing system of the present invention for reading and digitizing an image of an original document is characterized by comprising an original holding member for holding the original document and having an opening to be used for reading the original document, drive means for moving the original holding member when the original document is read, and eject means for ejecting the original document out of the original holding member upon completion of reading of the original document.

Also, an image digitizing system of the present invention for focusing an image of an original document on a line sensor and reading said image on the original document in a line form to be digitized is characterized by comprising an original holding member for holding the original document and having an opening to be used for reading the original document, a guide member consisting of rods extending in the axial direction for guiding a movement of the original holding member, drive means for driving the original holding member along the guide member when the original document is read, focus means for performing focusing adjustment of the image of the original document in the original holding member on the line sensor, and eject means for ejecting the original document out of the original holding member upon completion of reading of the original document.

As described above, according to the image digitizing system of the present invention, an original document can be ejected out of the original holding member easily upon completion of the reading of the original document. Also, since said image digitizing system has the focus means, an image of the original document in the original holding member can be focused on the line sensor.

BRIEF DESCRIPTION OF THE DRAWINGS

A preferred embodiment of the present invention is described in detail below with reference to the accompanying drawings, in which.

DETAILED DESCRIPTION OF THE PREFERRED EMBODIMENTS

The present invention is directed to a system of the general type disclosed in Applicant's copending Ser. No.

07/619,663 filed on Nov. 28, 1990 and entitled METHOD AND APPARATUS FOP RAPID SCANNING OF COLOR IMAGES, which is a continuation-in-part of Applicant's abandoned U.S. Ser. No. 07/511,649 filed on Apr. 20, 1990. The disclosure of each of these two prior applications is hereby incorporated herein by reference. The system disclosed in the prior applications includes mechanical, optical and electrical portions. The present invention relates to an improved mechanical arrangement for handling film which bears images to be digitized. The optical and electrical portions of the system embodying the present invention are effectively identical to the optical and electrical portions of the system disclosed in the two prior applications, and the optical and electrical portions are therefore not described herein in detail.

In practice, transparencies or slides 200 are typically framed in 50×50 millimeter mounts, while negatives are typically processed in strips of 4, 5 or 6 images. The preferred embodiment is disclosed with reference to these specific formats, but it will be recognized that the invention can be used with other formats.

Drive Mechanism

Figure 1:
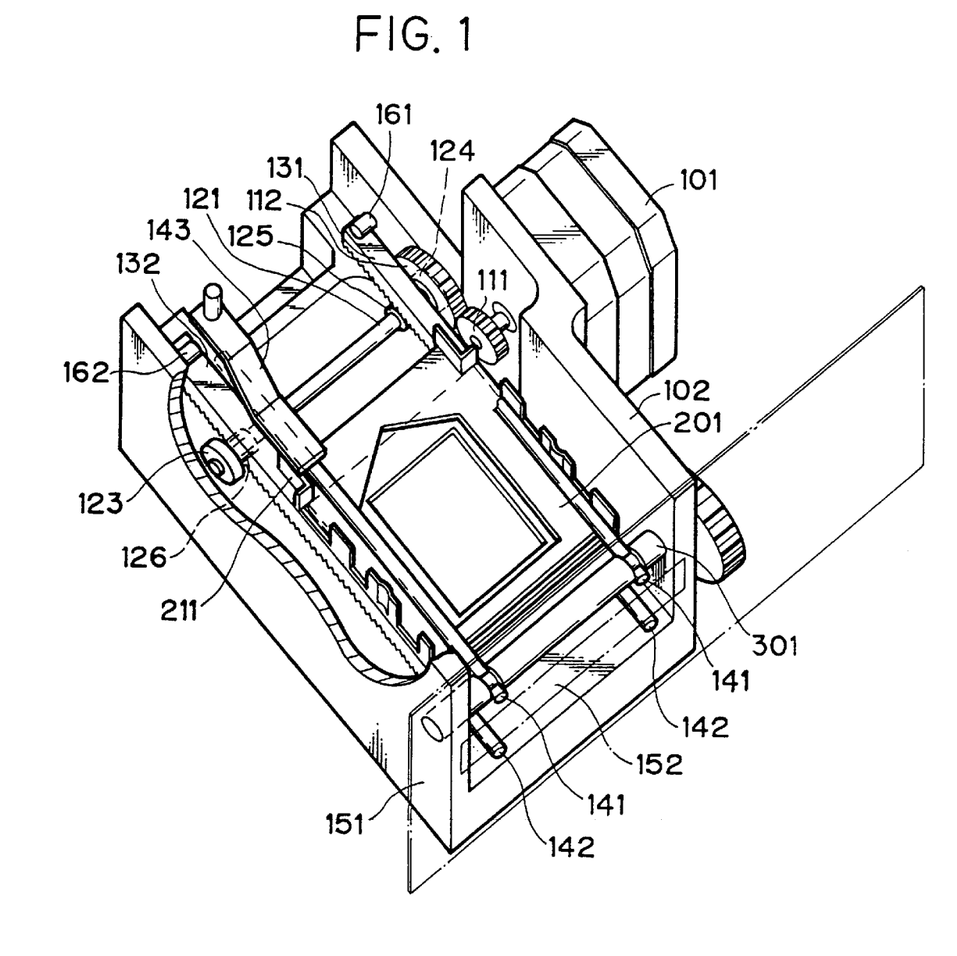
FIG. 1 is a fragmentary diagrammatic perspective view of a transport mechanism according to the invention, including a motor/drive assembly.

Attention is now drawn to FIG. 1, which illustrates pertinent mechanical parts of the system. A conventional stepper motor 101 is secured to a flange of a housing 102 which accommodates the entire scanning apparatus. Electrical components and optical components such as a light source, various mirrors, an imaging lens and a detector array have been omitted for clarity. The motor 101 has a shaft bearing a small gear 111, which meshes with a larger idler gear 112 fixedly secured to a shaft 121. The gears 111 and 112 could alternatively be replaced with a friction drive or an arrangement employing a belt and pulleys. The idler gear 112 rotatably drives the shaft 121, which is rotatably supported on the housing by two bearings 123 and 124. The shaft 121 also carries two pinions 125 and 126 which each mesh with a respective longitudinally movable rack 131 or 132. The two racks are rigidly connected to a transport carriage 201.

The transport carriage 201 is guided for reciprocal movement by a guide arrangement of rods 141–142 and bearings, which is equivalent to that disclosed in the above-mentioned prior applications. The guide arrangement is therefore described only briefly here. In particular, a pair of upper rods 141 are disposed above and extend approximately parallel to a pair of lower rods 142. The ends of the upper rods 141 remote from the front panel 151 are supported by the carriage which has its racks 131 and 132 supported by the pinions 125 and 126, which permits the ends of rods 141 adjacent the front panel 151 to move vertically a small amount. The lower rods 142 are supported at their ends adjacent the front panel by not-illustrated springs of the type disclosed in the above-mentioned prior patent, so that the ends adjacent to the front panel can move vertically a small amount. The transport carriage 201 includes an upper shell 201a having spaced bushing-like bearings slidably supported on the upper rods 141, and a lower shell 201b having spaced bushing-like bearings slidably supported on the lower rods 142. The upper rods 141 are each biased downwardly by a respective spring, one of which is shown in FIG. 1 at 143, thereby also urging the carriage downwardly so that the racks 131 and 132 are urged downwardly against the pinions, which in turn ensures that the gear teeth of the racks and pinions are fully in engagement without any significant play in order to provide zero backlash.

In the preferred embodiment the transport has the following pitch:

Motor 3.6° per full step
Idler gear ratio 1:3
Number of pinion teeth=12 with a 0.3 (metric) module
Driving the stepper with 32 mini-steps per 360 electrical thus yields a 0.15° rotation of the pinion per mini-step, and a 5 micron per mini-step feed resolution for the carriage.

The drive system provides enough friction so that, in conjunction with the gear ratio, the carriage 201 will remain in a fixed position even if the motor is not energized. This allows manual insertion of a slide 200 whenever the carriage is in its home position nearest the front panel 151, even if the motor has no power.

The pinions 125 and 126 act as a pivot axis about which the racks can rotate. This pivot axis and the pivot provided by a focussing cam 301 ensure that piece of film being digitized is always kept at a uniform height regardless of variations in the thickness of the frames in which different pieces of film are mounted. The carriage assembly 201 is limited in its forward travel by the front panel 151 as to rearward travel, there is no direct limit on rearward travel of the carriage itself, but rearward travel of an ejector 211 is limited by a pair of claws 161 and 162 on the housing which can engage the ejector 211 of the carriage.

Eject Operation

In order to perform a scanning operation, the entire slide 200 is pushed into the unit through a narrow slotlike passageway or opening 152 in the front panel 151. This opening is kept small in order to positively key the slide to the proper position, to minimize the entry of dust, and to protect the detector array from ambient light. Once the slide is inside the scanning apparatus, it is inaccessible to the user. A mechanism must therefore be provided to eject the slide at the end of scanning.

Figures 2A, 2B:
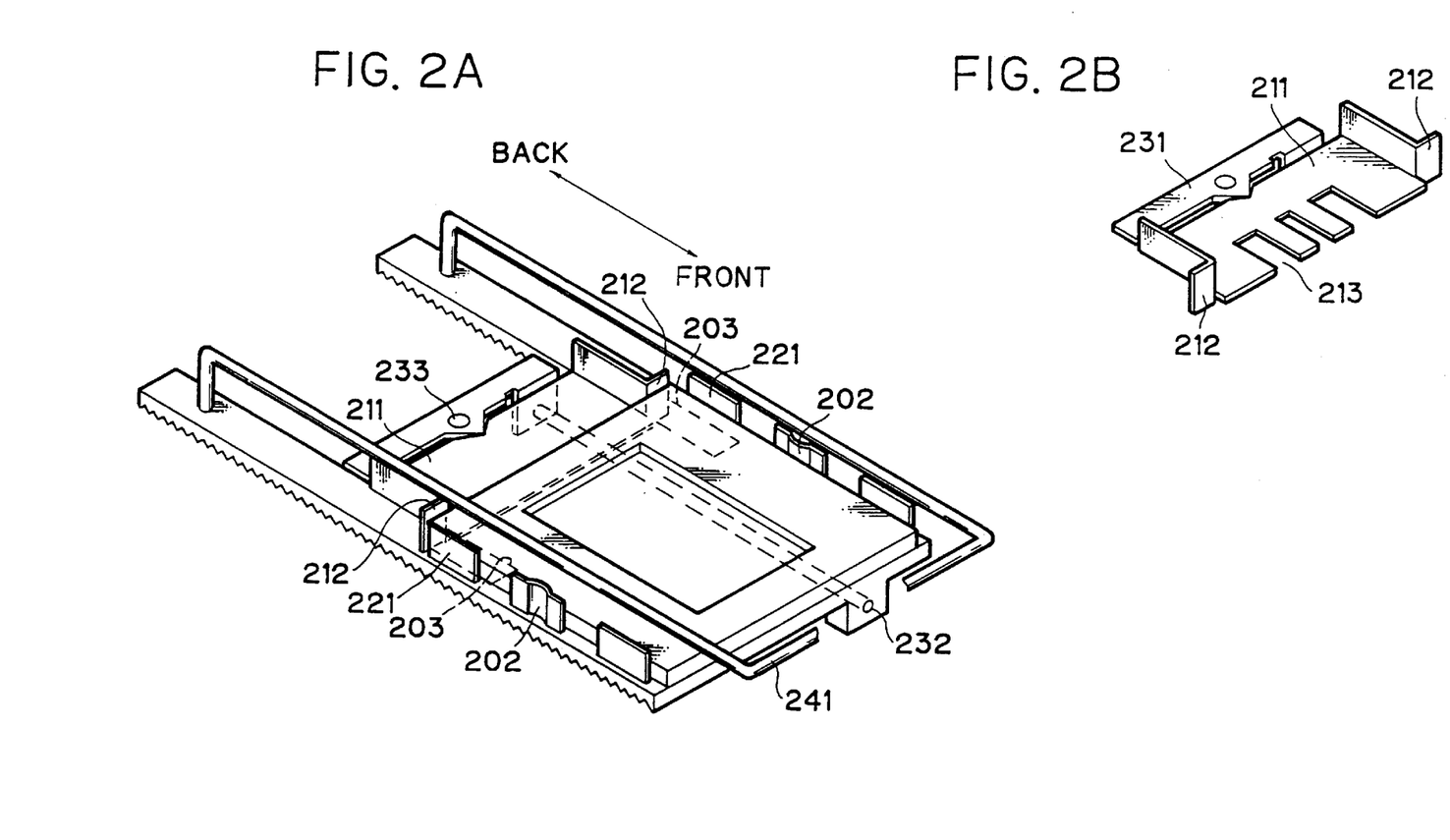
FIG. 2A is a diagrammatic perspective view of an outer part of a slide jacket which is a component of the mechanism of FIG. 1, including structure which provides angular adjustment and automatic ejection of a slide.
FIG. 2B is a diagrammatic perspective view of an ejector and tilt bar which are components of the slide jacket of FIG. 2A.

FIG. 2A illustrates the eject mechanism. The above-mentioned ejector 211 (FIG. 2B) is located inside a slide jacket 221. The ejector 211 carries stops 212, against which the slide is seated. When a slide is manually inserted, the slide pushes stops 212 and ejector 211 rearwardly. The final position of the stops is determined by a tilt bar 231, which is described below.

During scanning of a slide, the motor 101 moves the carriage 201 far enough to expose the entire slide image to the optical components, so that the system can digitize the entire image field. Typically, this travel is 36 mm. If the user has specified via software that the slide is to be ejected, the software causes the control circuit to control the motor so as to move the carriage 201 an additional 14 mm. At the start of this over-travel, the ejector 211 engages the claws 161 and 162, which are part of the housing 102. The carriage 201 will thus continue its travel while the ejector 211, the stops 212 and the slide are held in a predetermined place. The ejector 211 is held in a predetermined place vertically and sideways by its shape, which mates with the shell of the carriage 201. Along the axis of travel the ejector can travel approximately 14 mm. Forward travel is limited by a cutout 203 (FIG. 2) provided in the carriage assembly, and rearward travel by a tilt bar 231. The stationary slide is therefore pushed partially out of the carriage 201 by the amount of carriage over-travel. When the transport direction is then reversed and the carriage is brought to its home position adjacent front panel 151, the slide will extend out of the opening 152 by the amount of over-travel. The operator can thus comfortably remove it from the unit. The ejector is manually returned to its original position when a new slide is manually inserted.

The ejector 211 has several elongate slits 213. The pattern in which slits 213 are arranged is used as a code to differentiate whether the ejector or the slide frame is in the optical path, and allows the system to determine if the carriage is loaded with a slide. In particular, when the carriage is in its home position, the region which is imaged onto the detector array corresponds to a line extending across the portion of the ejector 211 which has the slits 213, and the system can examine the detected image for a pattern of bright and dark line segments corresponding to the slits. If the detector array senses black in this part of the image, a slide must be in the carriage since the slide mount will obstruct the optical path. If no slide has been inserted, either zero attenuation (i.e. maximum light source intensity) or the code pattern of the ejector (pattern of light and dark line segments) is detected.

On power-up, an eject operation is automatically executed to eject any slide which might have been left in the carriage inadvertently or which might be stuck because of a hang-up.

Emergency Ejector

Since it is always conceivable that power might suddenly fail completely during system operation, the apparatus also features a manual emergency ejector 241, which is shown in FIG. 2. The emergency ejector is seated in a recess in the front panel 151 and is thus accessible from the outside. In the case of a crash, the carriage 201 could be located in any position along its path of travel. The emergency ejector 241 pulls the carriage 201 all the way forward to its home position against the front panel 151. Since the emergency ejector 241 engages the ejector stops 212, the slide will extend out of the opening 152 in the front panel.

Rotational Adjustment

For many applications, the exact orientation of the slide is not critical. For these applications, the edges of the window in the slide mount are a sufficient reference for the horizontal and vertical major axes. In some applications, however, the image orientation is more critical. For example, technical, architectural and product images often require precise angular orientation.

Since software rotation is very time-consuming and can degrade the image quality, the present invention avoids software rotation by providing precise mechanical adjustment of the angular orientation before scanning. FIG. 2 is again used for the purpose of illustration. The sidewalls of the jacket 221 have been formed to provide a wide slide receiving channel (about 52 mm in the preferred embodiment) for easy slide insertion. At the center of each side of the jacket is a convex protrusion 202, the distance between the two protrusions 202 being substantially the exact width of a slide frame. The protrusions 202 thus center the slide, while permitting it to be rotated a few degrees about a central vertical axis.

The ejector stops 212, which positively position the slide, are not fixed in their location relative to the carriage but are capable of some limited adjustment. This adjustment is effected by the tilt bar 231 which defines the angular position of the ejector 211 and thus of the stops 211 thereon. This tilt bar is pivotally supported on the slide jacket by a vertical rivet 233, which gives the tilt bar the ability to pivot a few degrees about a vertical axis. The angular orientation of the tilt bar can be adjusted by a screw 232 which is rotatably supported on and extends the length of the outer slide jacket, which is held against axial movement relative to the slide jacket, and which threadedly engages a threaded hole in a flange of the tilt bar 231 at a location spaced radially from the rivet 233. When the carriage is in its home position, the head of this screw becomes accessible from the outside through a small hole in the front panel.

The operator uses this feature in the following manner. The image is scanned in the normal position. If a critical reference line appears tilted in the resulting digitized image, the user will measure the angle of tilt in the image, either with a software tool or with a conventional ruler or protractor. The adjustment is calibrated by providing one degree of tilt per single full screw rotation. With this capability, the slide or negative carrier can be accurately aligned to the sensor when positively seated against the stops.

In a simplified alternative version of this arrangement, the ejector 211 could rest against the rivet 233 without the provision of the adjustment screw 232. While not providing calibrated rotational adjustment, this still allows the slide to be rotated about its center.

Fine Focus/Autofocus

Figure 3:
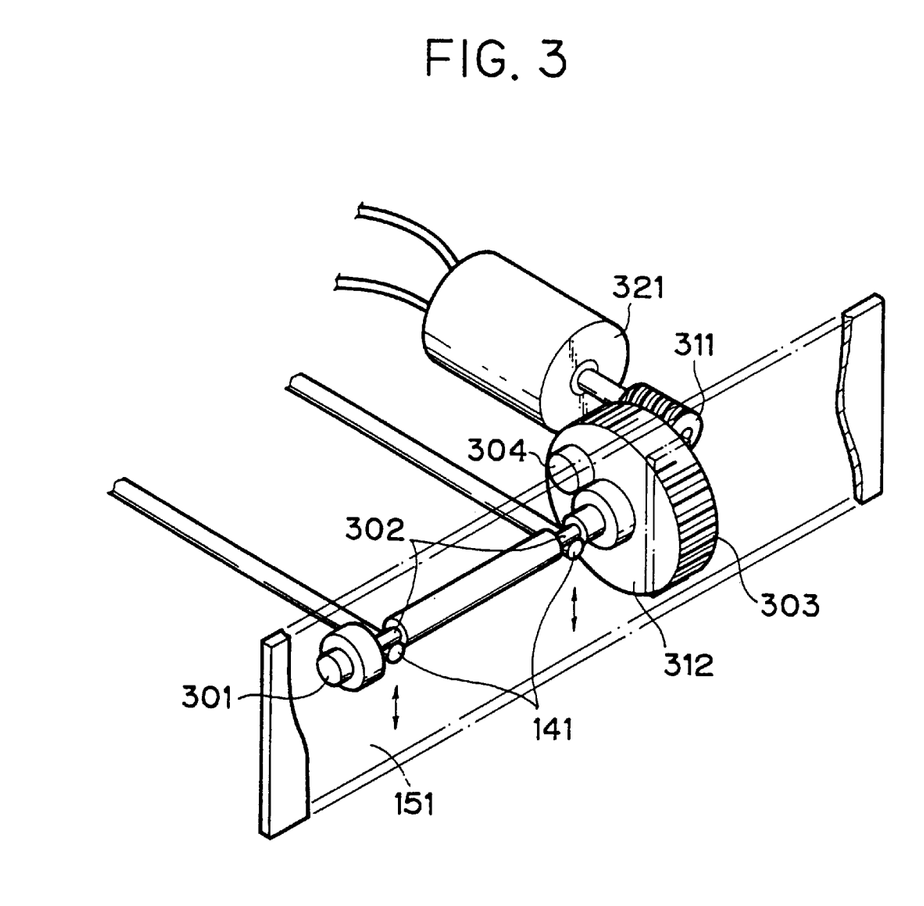
FIG. 3 is a fragmentary diagrammatic perspective view of a cam arrangement with manual and servo control allowing fine focus adjustments.

The focusing arrangement is illustrated in FIG. 3. The interaction of the upper rods 141 and lower rods 142 with the transport carriage 201 ensures that most slides do not need any focusing adjustment. Regardless of the thickness of the mount, the film is always kept vertically centered. However, if the user is scanning glass-mounted slides, the optical path will be lengthened. There are also some exotic mounts in which the film is not centered. Additionally, one might want to purposely defocus the image for special effects. For these cases, a manual and motorized focus control is provided.

In the preferred embodiment, focussing is accomplished by adjusting the height of the front ends of the upper rods 141. These rods are supported at their front ends in respective grooves 302 machined into an elongate focussing cam member 301 which is supported on housing 102 for rotation about its lengthwise axis, the grooves 302 being eccentric to the axis of rotation. The focussing cam member can be rotated manually by a focus knob 303 which projects through a slot in the front panel 151. The focus knob 303 has a stop 304 which can engage the front panel 151 to limit its rotation. The film can be raised or lowered approximately 1 millimeter by cam member 301. It is further possible to couple the cam member 301 through a friction clutch 312 having a pinion to a worm gear 311 driven by a stepper motor 321, allowing for automatic focusing.

Adaptor for Negative Strips

The use of a transparency digitizer for the purpose of scanning negatives is highly desirable. While slides are framed in 50×50 mm mounts, negatives are typically kept as film strips of up to six frames per strip. This format is advantageous for both archiving and handling. A scanning system which required cutting and mounting of individual negative frames would be disadvantageous and undesirable.

Figure 4:
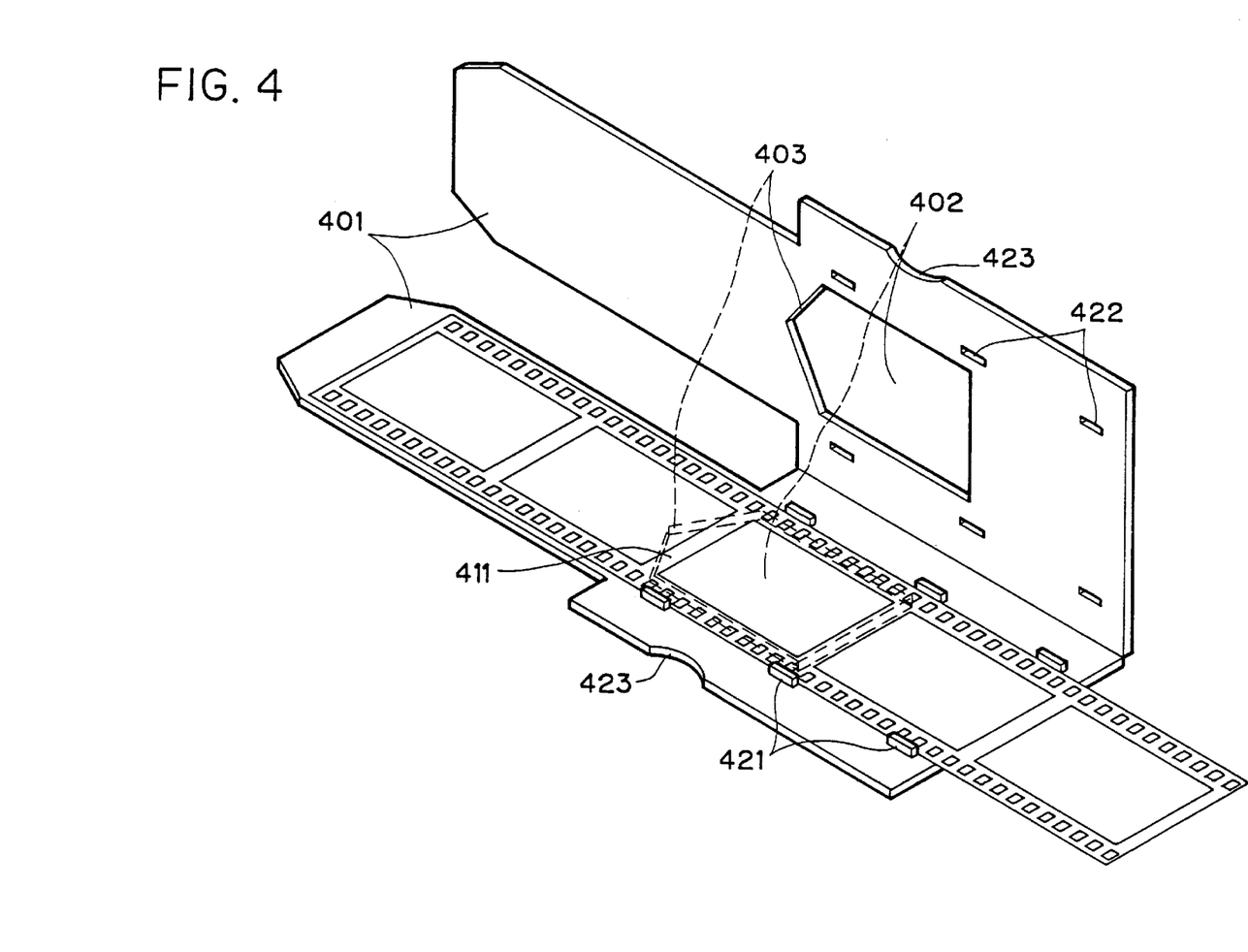
FIG. 4 is a diagrammatic perspective view which shows an adaptor used to handle negatives in strips.

The preferred embodiment has been designed to accommodate film strips, in the following manner. As shown in FIG. 4, an adaptor 401 can support a negative strip and can be inserted into the scanning apparatus. This adaptor has a central area which resembles a slide mount, in that it has a 24×36 mm opening 402. The user centers the particular frame of the film strip to be scanned within this opening. The first three frames of a six-frame strip can be scanned in their proper orientation. The length of the scanner allows it to receive only about half of the length of the film strip, and therefore to scan the remaining three frames the strip is physically reversed in the adaptor 401. Images will thus be scanned from the reverse strip upside down, and after scanning the resulting image has to be flipped digitally so that the data is in the proper format. Software capable of flipping a digital image is known and is not a part of the present invention, and therefore is not described here in detail. As shown in FIG. 4, the opening 402 has at one end a triangular extension 403. This extension exposes a border area 411 of the film located between two frames. Before digitization of the image data, the scanning apparatus can sample the density in this unexposed area to establish a black reference.

The rear portion of the adaptor, which is inserted first into the scanning apparatus, is 40 mm wide, which is enough to accept the 35 mm film width but also leaves 5 mm on either side for retention by the ejector stops 212 (FIG. 2). The rear portion has a length sufficient to accommodate two additional frames beyond the frame being scanned. The opposite or front end of the adaptor is long enough so that a part of it always projects out of the scanning apparatus to protect the film in any position, and has the width of a standard slide mount, namely 50 mm. The adaptor 401 has upper and lower shells or plates, the lower shell having upwardly projecting pins 421 which mate with holes 422 in the upper shell to facilitate the alignment of the negative strip by virtue of the pins on opposite sides or the opening 402 being spaced by a distance which is the width of a standard film strip. The upper and lower shells of the adaptor are pivotally coupled for ease of handling, for example by a hinge. Offset cutouts 423 in the upper and lower shell of the adaptor along an edge of each opposite from the hinge facilitate opening of the carrier.

This or a similar adaptor can also be used to manage single unmounted slide frames, or other transparent material such as dental X-ray films or glass microscope slides.

Inside the scanning apparatus, two important features facilitate use of the adaptor 401. Referring to FIG. 1, the stops 212 which positively orient the slide mount are spaced by a distance sufficient for film and carrier to pass. Also, there must be enough depth clearance toward the rear to allow unobstructed passage for the length of the adaptor. Typically, the adaptor penetrates into the scanning apparatus beyond the scanning area by at least two additional frames of 38 mm each.

Carousel Extension

In some applications, it is desirable to automatically scan a large number of slides. The use of a standard straight or carousel tray is therefore indicated. The disclosed scanning apparatus can operate in any orientation, and for this application it is located underneath the tray with the carriage traveling vertically. For a tray scanning station, the carriage assembly is implemented in a slightly different fashion. The ejector provides essentially a solid back wall for the jacket. The path of travel of the carriage is increased to include transporting the slide from inside the tray to the scanning position. After each full scanning cycle, a feed ratchet automatically advances the tray to the next position. Such an arrangement can digitize a 120 slide carousel in about 6 hours for off-line batch digitization.

Scanning of Roll Material

Figure 5:
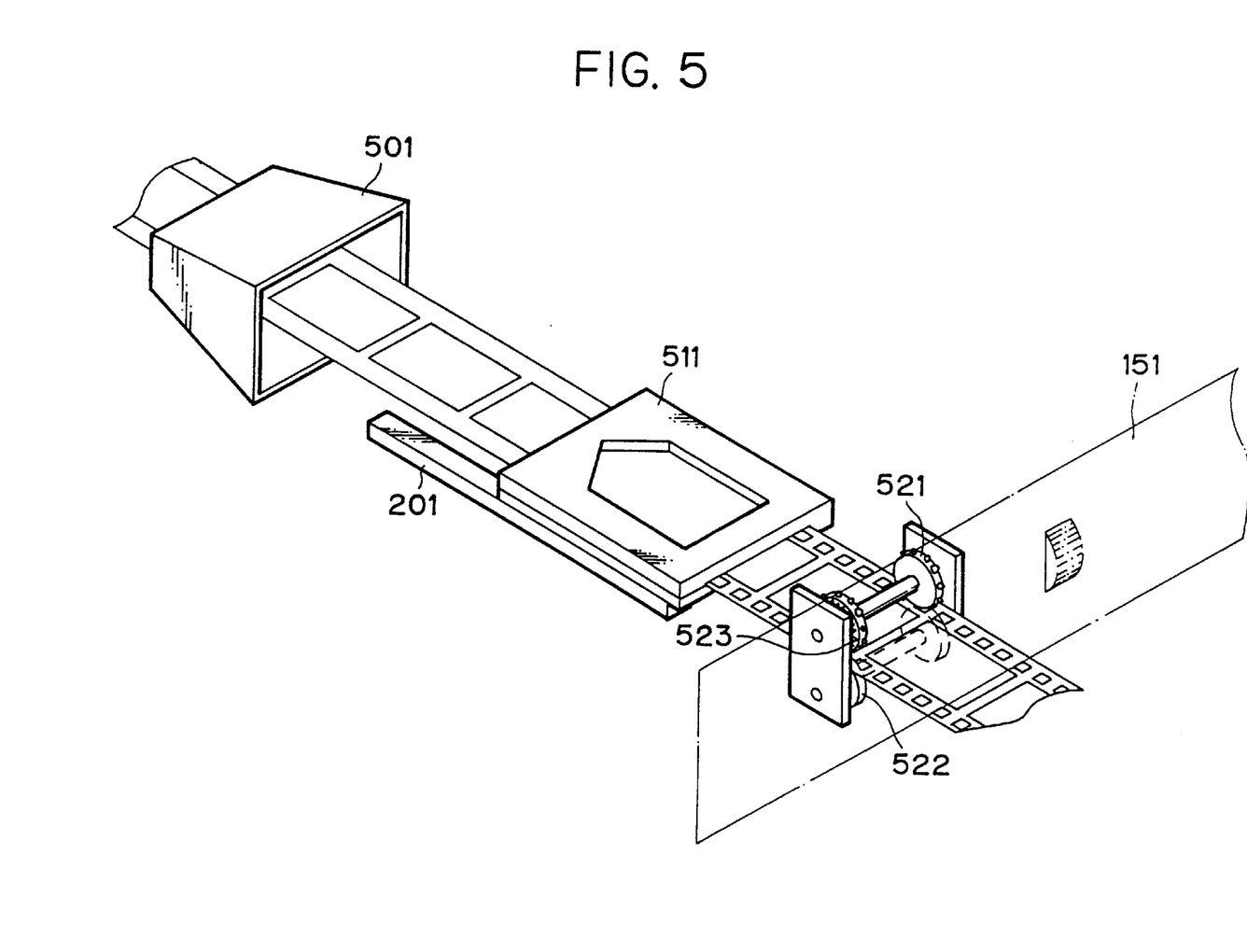
FIG. 5 is a diagrammatic perspective view of part of a variation of the embodiment of FIG. 1 which permits continuous processing of frames on a film roll.

In another application for volume scanning, image data is stored on an elongate film strip having 24, 36 or more exposures. A variation of the disclosed embodiment which accommodates this application is shown in FIG. 5. In conjunction with the passage provided for the negative strip carrier, a rear opening 501 and an adaptor or chute 511 to guide the film have been added to allow handling of entire film strips or larger reels.

The adaptor 511 guides the film material in the pull-in direction. A set of two spaced sprocket wheels 521 and associated pinch rollers 522 retain the film when the carriage returns to its home position. In particular, the sprocket wheels include a ratchet mechanism 523 of a conventional type which allows the film to advance when the carriage moves in the feed direction, but keeps it from moving in the opposite direction as the carriage returns. The sprocket wheel and pinch roller assembly can be releasably snapped to the front panel. The scanning apparatus can automatically advance to the next frame. By analyzing the image data from scanning, the system can also automatically recognize frames that are placed irregularly on the film due to camera idiosyncrasies. This embodiment efficiently scans slide or negative film and finds application in laboratories and stock photography houses.

Although a particular preferred embodiment of the invention has been disclosed in detail for illustrative purposes, it will be recognized that variations or modifications of the disclosed apparatus, including the rearrangement of parts, lie within the scope of the present invention.

In this regard, it will be recognized that the apparatus and method described above are directly applicable to a variety of image digitization tasks including different formats, monochrome films and even opaque originals. The preferred embodiment applies them specifically to the digitization of 35 mm color transparencies or negatives, but this is not to be considered limiting.

The eject mechanism described with FIG. 2 will be described in full with reference to FIGS. 6A to 6C.

Figure 6A:
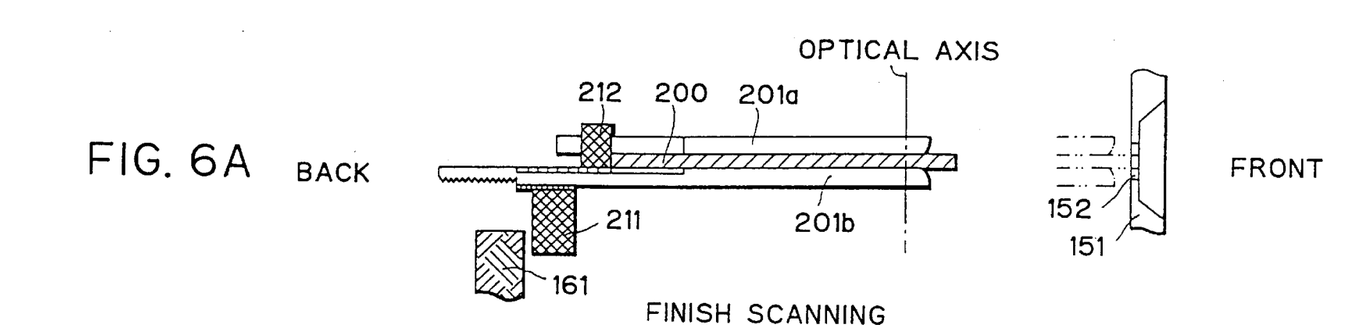
FIGS. 6A to 6C are cross-sectional diagrammatic views showing an eject mechanism of a film in response to a movement of a carriage.
Figure 6B:
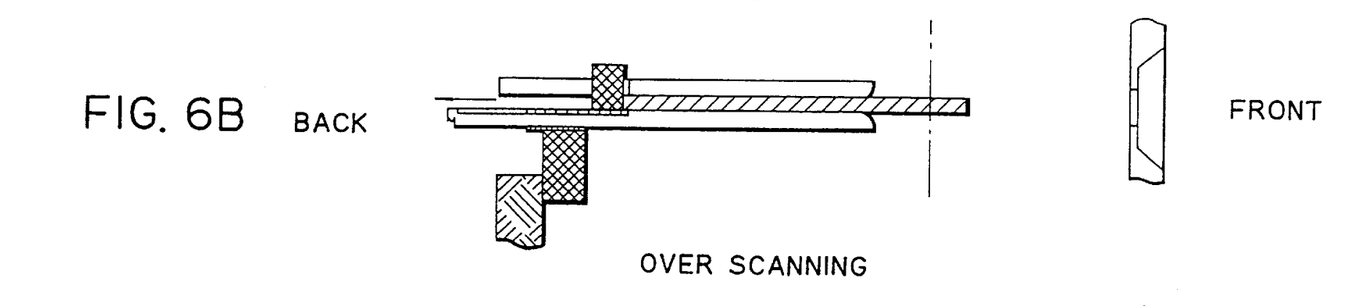
Figure 6C:
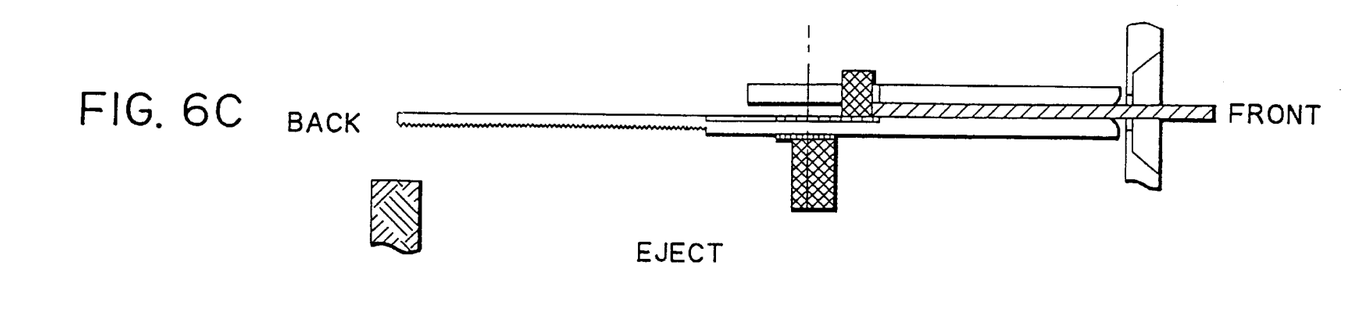

Note that the ejector 211 and the claw 161, which are protruding upwardly from the carriage 201 in FIG. 2, are protruding downwardly in FIGS. 6A to 6C.

FIG. 6A illustrates a state before the slide 200 is housed in the carriage 201 and the claw 161 which is part of the housing collides with the ejector 211, i.e., a state after the reading of the image data is completed.

FIG. 6B illustrates a state in which the carriage 201 has been driven by the motor to travel further rearwardly from the state in FIG. 6A. Even if the claw 161 collides with the ejector 211, the carriage 201 continues to travel rearwardly further. On the other hand, the ejector 211 remains at the fixed position since it engages the claw 161. Therefore, the slide 200 which is in contact with the stop 212 of the ejector 211 also remains at the fixed position. Thus, the slide 200 is relatively displaced from the carriage 201 forwardly and rearwardly.

FIG. 6C is a view showing a state in which the carriage 201 has been driven by the motor to travel toward the front panel direction from the position in FIG. 6B. Since the slide 200 is relatively displaced in a forward direction from the carriage 201, when the carriage 201 reaches the edge of the front panel direction by the driving of the motor, the slide 200 is protruding from the opening 152. Therefore, the operator can remove the slide from the unit.

Figure 7:
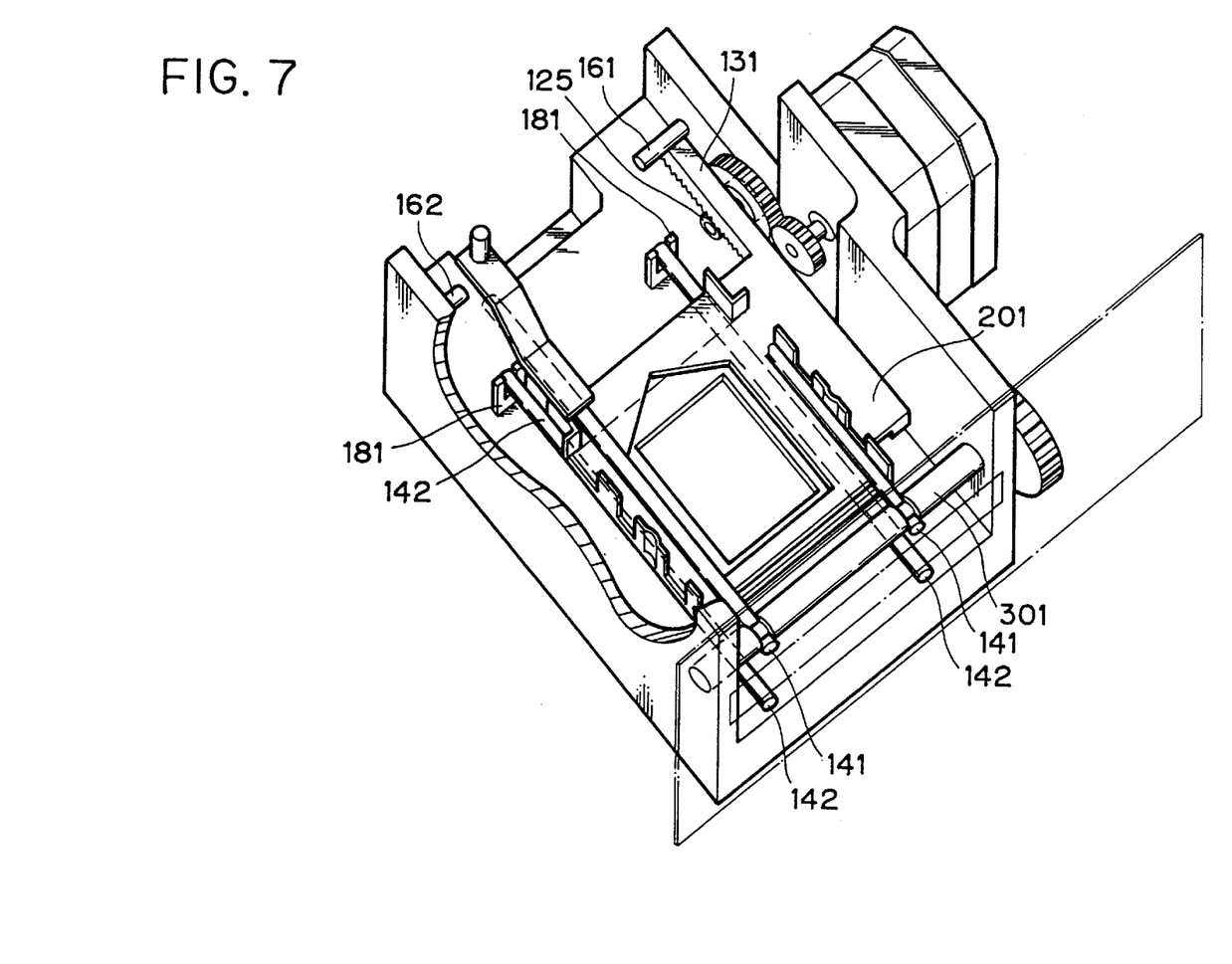
FIG. 7 is a fragmentary diagrammatic perspective view of another embodiment of the transport mechanism and the fine focus adjustment mechanism.

Another embodiment will be described next. When an image is read only in one direction so that there is no problem of backlash, a drive mechanism as shown in FIG. 7 can be provided. The embodiment in FIG. 1 employs two racks and two pinions. However, the embodiment shown in FIG. 7 has only one rack and one pinion in a set, pivoting upon one end of paired lower rods. Different portions from the embodiment in FIG. 1 will be specifically explained below.

One rack 131 is formed on the carriage 201. A pinion 125 which engages said rack 131 is disposed. Since the rack is arranged on one side of the carriage, it is no longer necessary to adjust engagement and engaging positions between the racks and pinions on the both sides as in the previous embodiment, which results in a simple assembling and adjustment. Also, very high precision is not required for gears and parts for installing the gears.

In the present embodiment, rear end of the lower rod 142 (at a far position from the opening) is arranged to be in contact with a lower rod receiving portion 181. Focusing is accomplished by using a contact point between said lower rod and the lower rod receiving portion as a fulcrum for rotation.

Figure 8:
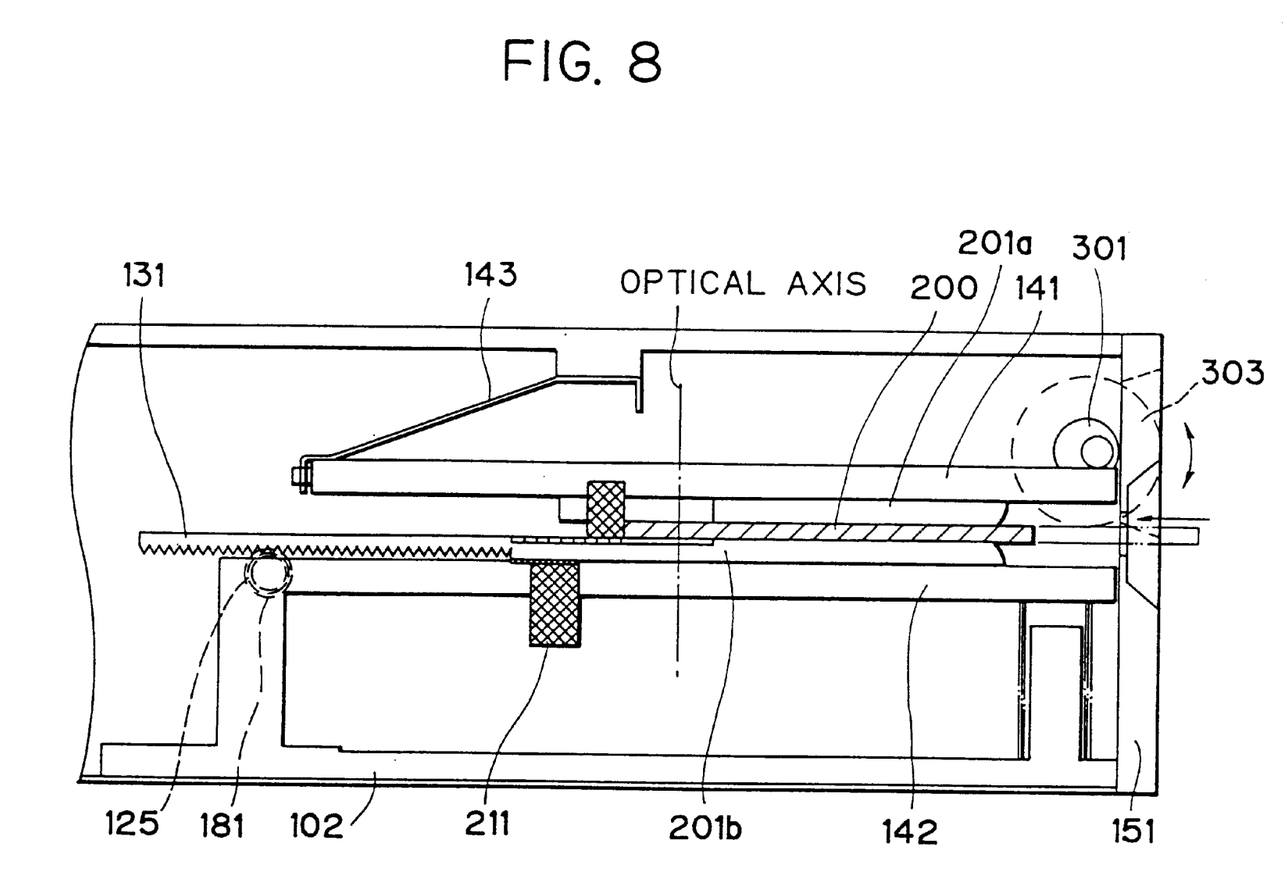
FIG. 8 is a cross-sectional diagrammatic view showing a focusing mechanism according to the other embodiment of the invention.

Full description will be made with reference to FIG. 8. An upper carriage 201a is brought into contact with an upper rod 141. A slide 200 is inserted between said upper carriage 201a and a lower carriage 201b. The lower carriage 201b is in contact with the lower rod 142. When the upper rod 141 is biased downwardly by a spring 143, the lower rod 142 is biased downwardly through the upper carriage 201a, the slide 200 and the lower carriage 201b. Therefore, the lower rod 142 is biased to the lower rod receiving portion 181 of the housing 102. In this case, a position of engagement between the rack 131 and the pinion 124 and a position at which the end of the lower rod 142 is in contact with the lower rod receiving portion 181 are approximated to each other in the longitudinal direction and the vertical direction. Thus, even when the focusing position is vertically moved by a cam member 301, backlash between the rack 131 and the pinion 125 does not change.

Therefore, when a focus knob 303 is rotated, the focusing position of the slide 200 changes by using the lower rod receiving portion 181 as a fulcrum for rotation.

What is claimed is:

1. An image reading apparatus which reads a transparent original, comprising:
   a support mechanism which supports the original;
   an illumination device which illuminates the original supported in the support mechanism;
   an image sensor which reads an image of the illuminated original;
   a detection device which detects whether the original, properly positioned in the support mechanism, is being supported by the support mechanism; and
   a discharge mechanism which moves against the support mechanism to discharge the original from the support mechanism when the detection device detects that the original, properly positioned in the support mechanism, is supported by the support mechanism and the apparatus is initially powered up.

2. An image reading apparatus as in claim 1, wherein the support mechanism comprises:
   an indicator which indicates when the original is not supported by the support mechanism, the detection device producing a no-original signal when the indicator indicates that the original is not supported by the support mechanism.

3. An image reading apparatus as in claim 2, wherein the indicator comprises a retraction structure which retracts from a detection position when the original is supported by the support mechanism.

4. An image reading apparatus as in claim 1, wherein
   the original is pinched between a pair of supporting members to be supported by the support mechanism, and
   the detection device detects whether the original is being supported by the support mechanism by detecting the pair of supporting members.

5. An image reading apparatus as in claim 1, wherein the image sensor operates as the detection device.

6. An image reading apparatus as in claim 1, wherein, when the discharge mechanism moves against the support mechanism to discharge the original, the relative position of the original with respect to the support mechanism changes.

7. An image reading apparatus as in claim 1, wherein the support mechanism is a movable carriage.

8. An image reading apparatus which reads a transparent original, comprising:
   support means for supporting the original;
   illumination means for illuminating the original supported by the support means;
   image sensing means for reading an image of the illuminated original;
   detection means for detecting whether the original, properly positioned in the support means, is being supported by the support means; and
   discharge means for moving against the support means to discharge the original from the support means when the detection means detects that the original, properly positioned in the support means, is supported by the support means and the apparatus is initially powered up.

9. An image reading apparatus as in claim 8, wherein the support means comprises:
   indicator means for indicating when the original is not supported by the support means, the detection means producing a no-original signal when the indicator means indicates that the original is not supported by the support means.

10. An image reading apparatus as in claim 9, wherein the indicator means comprises a retraction means for retracting from a detection position when the original is supported by the support means.

11. An image reading apparatus as in claim 8, wherein
    the original is pinched between a pair of supporting members to be supported by the support means, and
    the detection means detects whether the original is being supported by the support means by detecting the pair of supporting members.

12. An image reading apparatus as in claim 8, wherein the image sensing means operates as the detection means.

13. An image reading apparatus as in claim 8, wherein, when the discharge means moves against the support means to discharge the original, the relative position of the original with respect to the support means changes.

14. An image reading apparatus as in claim 8, wherein the support mechanism is a movable carriage.

15. An image reading apparatus which reads a transparent original, comprising:
    a movable carriage which supports the original;
    an illumination device which illuminates the original supported in the carriage;
    an image sensor which reads an image of the illuminated original;
    a detection device which detects whether the original, properly positioned in the carriage, is being supported by the carriage; and
    a discharge mechanism which, when the detection device detects that the original, properly positioned in the carriage, is supported by the carriage and the apparatus is initially powered up, moves against the carriage so that a relative position of the original with respect to the carriage changes to thereby discharge the original from the carriage.

16. An image reading apparatus which reads a transparent original, comprising:
- a movable carriage which supports the original;
- an illumination device which illuminates the original supported in the carriage;
- an image sensor which reads an image of the illuminated original;
- a detection device which detects whether the original, properly positioned in the carriage, is being supported by the carriage; and
- a discharge mechanism which, when the detection device detects that the original, properly positioned in the carriage, is supported by the carriage and the apparatus is initially powered up, causes a relative position of the original with respect to the carriage to change and thereby discharge the original from the carriage.

* * * * *